(12) United States Patent
Shachar et al.

(10) Patent No.: US 12,124,722 B2
(45) Date of Patent: Oct. 22, 2024

(54) DYNAMIC OVER-PROVISIONING OF STORAGE DEVICES

(71) Applicant: Dell Products L.P., Round Rock, TX (US)

(72) Inventors: Tomer Shachar, Beer Sheva (IL); Yevgeni Gehtman, Modi'in (IL); Ophir Buchman, Raanana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/109,612

(22) Filed: Feb. 14, 2023

(65) Prior Publication Data

US 2024/0272822 A1 Aug. 15, 2024

(51) Int. Cl.
*G06F 3/06* (2006.01)

(52) U.S. Cl.
CPC .......... *G06F 3/0644* (2013.01); *G06F 3/0604* (2013.01); *G06F 3/0617* (2013.01); *G06F 3/0673* (2013.01)

(58) Field of Classification Search
CPC .... G06F 3/0644; G06F 3/0604; G06F 3/0617; G06F 3/0673
See application file for complete search history.

(56) References Cited

U.S. PATENT DOCUMENTS

| | | | | |
|---|---|---|---|---|
| 10,599,512 | B2 * | 3/2020 | Aiyar | G06F 9/45558 |
| 11,061,814 | B1 * | 7/2021 | O'Brien, III | G06F 3/0616 |
| 2015/0339070 | A1 * | 11/2015 | Lee | G06F 12/00 |
| | | | | 711/103 |
| 2017/0315745 | A1 * | 11/2017 | Agombar | G06F 3/0653 |
| 2020/0110545 | A1 * | 4/2020 | Choi | G06F 3/0679 |
| 2020/0201548 | A1 * | 6/2020 | Yim | G06F 3/064 |
| 2020/0210074 | A1 * | 7/2020 | Nakashita | G06F 3/065 |

(Continued)

OTHER PUBLICATIONS

"How Over-Provisioning Can Benefit SSD Performance"; https://www.atpinc.com/blog/over-provisioning-SSD-benefits-trim-wear-leveling; Oct. 25, 2018.

(Continued)

*Primary Examiner* — Hiep T Nguyen
(74) *Attorney, Agent, or Firm* — Ryan, Mason & Lewis, LLP (57) ABSTRACT

Techniques are provided for dynamic over-provisioning of storage devices. One method comprises obtaining a partitioning of a storage device associated into a first partition and an over-provisioning partition based on an over-provisioning ratio of the storage device, wherein portions of the over-provisioning partition are reallocated as portions of the first partition to replace portions of the first partition; storing user data associated with write operations in the first partition; monitoring a size of the over-provisioning partition; and dynamically adjusting the size of the over-provisioning partition in response to the size of the over-provisioning partition reaching a threshold. The dynamically adjusting the size of the over-provisioning partition may comprise reducing a size of the first partition. The reducing the size of the first partition may comprise the operating system reducing a size of the first partition and reallocating the reduced size of the first partition to the over-provisioning partition.

20 Claims, 7 Drawing Sheets

500

502 — OBTAIN, BY AT LEAST ONE PROCESSING DEVICE, A PARTITIONING OF AT LEAST ONE STORAGE DEVICE ASSOCIATED WITH THE AT LEAST ONE PROCESSING DEVICE INTO A FIRST PARTITION AND AN OVER-PROVISIONING PARTITION BASED AT LEAST IN PART ON AN OVER-PROVISIONING RATIO OF THE AT LEAST ONE STORAGE DEVICE, WHEREIN PORTIONS OF THE OVER-PROVISIONING PARTITION ARE REALLOCATED AS PORTIONS OF THE FIRST PARTITION TO REPLACE PORTIONS OF THE FIRST PARTITION

504 — STORE USER DATA ASSOCIATED WITH ONE OR MORE WRITE OPERATIONS IN THE FIRST PARTITION

506 — MONITOR A SIZE OF THE OVER-PROVISIONING PARTITION

508 — DYNAMICALLY ADJUST THE SIZE OF THE OVER-PROVISIONING PARTITION IN RESPONSE TO THE SIZE OF THE OVER-PROVISIONING PARTITION REACHING A THRESHOLD (56) References Cited

U.S. PATENT DOCUMENTS

| | | | |
|---|---|---|---|
| 2020/0210331 A1* | 7/2020 | Muchherla | G06F 3/064 |
| 2021/0141626 A1* | 5/2021 | Ladkani | G06F 3/0676 |
| 2021/0272645 A1* | 9/2021 | Yoon | G11C 29/38 |
| 2022/0269409 A1* | 8/2022 | Zeng | G06F 3/0679 |
| 2022/0414222 A1* | 12/2022 | Phan | G06T 1/20 |

OTHER PUBLICATIONS

"Understanding SSD Over-Provisioning"; EDN; https://www.edn.com/understanding-ssd-over-provisioning/; Jan. 8, 2013.
Handy, Jim; "The SSD Guy Blog, How Controllers Maximize SSD Life—Over Provisioning"; https://thessdguy.com/how-controllers-maximize-ssd-life-over-provisioning/; downloaded on Mar. 13, 2023.

\* cited by examiner

DYNAMIC OVER-PROVISIONING OF STORAGE DEVICES

FIELD

The field relates generally to information processing systems, and more particularly to the storage of information associated with such information processing systems.

BACKGROUND

Storage over-provisioning techniques provide a reserve storage capacity in a storage device, such as a solid-state device (SSD). The reserve storage capacity may vary in size for different storage devices but typically comprises a percentage of the total capacity of a given storage device (sometimes referred to as an over-provisioning ratio). Over-provisioning typically improves performance and increases the endurance of storage devices.

SUMMARY

In one embodiment, a method comprises obtaining, by at least one processing device, a partitioning of at least one storage device associated with the at least one processing device into a first partition and an over-provisioning partition based at least in part on an over-provisioning ratio of the at least one storage device, wherein portions of the over-provisioning partition are reallocated as portions of the first partition to replace portions of the first partition; storing user data associated with one or more write operations in the first partition; monitoring a size of the over-provisioning partition; and dynamically adjusting the size of the over-provisioning partition in response to the size of the over-provisioning partition reaching a threshold.

In some embodiments, the dynamically adjusting the size of the over-provisioning partition may comprise reducing a size of the first partition. The reducing the size of the first partition may comprise reallocating unused portions of the first partition to the over-provisioning partition. The reducing the size of the first partition may comprise the operating system reducing a size of the first partition and reallocating the reduced size of the first partition to the over-provisioning partition.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dynamic over-provisioning of storage devices.

As noted above, storage over-provisioning techniques provide a reserve storage capacity in a storage device. For SSD storage devices, for example, an over-provisioning ratio is typically a firmware-level configuration that controls a number of cells from the overall capacity that are set aside as "reserve cells" or "spare cells." The over-provisioning ratio is a static value established during a manufacturing of a given storage device and is typically based on average cell burnout studies. The over-provisioning ratio is often optimized to improve the lifespan of a given storage device.

The SSD cells within the reserve storage capacity are used when one or more unreserved cells require a replacement, for example, following a failure of a given cell. The remaining number of cells in the reserve storage capacity of a given storage device provides a measure of the health of the given storage device. Generally, once the reserve storage capacity of a storage device is exhausted, any access to an additional failed cells will result in input/output (I/O) errors.

One or more aspects of the disclosure recognize that unoccupied unreserved cells, for example, may be dynamically designated (or reallocated) as reserve cells. In some embodiments, the size of an over-provisioning partition (and/or the over-provisioning ratio) may be dynamically adjusted when the current size of the over-provisioning partition reaches a threshold.

Figure 1:
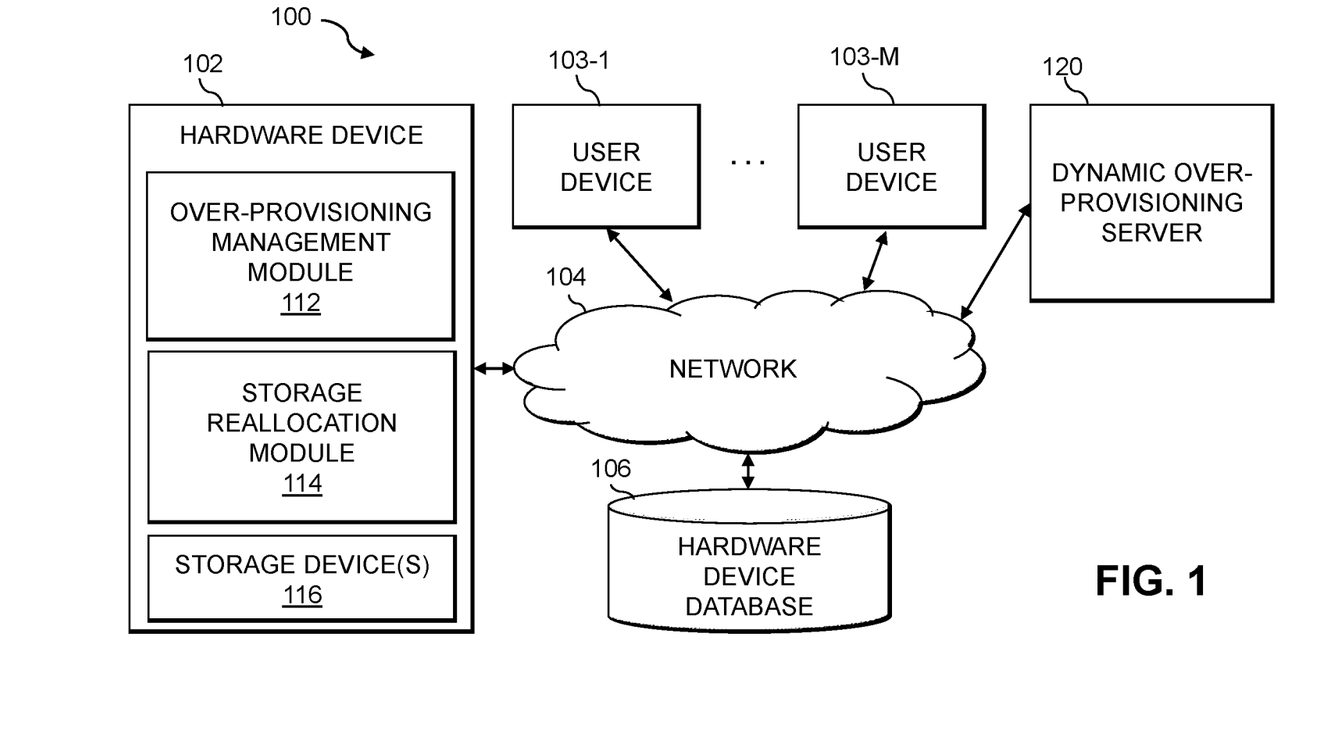
FIG. 1 illustrates an information processing system configured for dynamic over-provisioning of storage devices in accordance with an illustrative embodiment.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more hardware devices 102, one or more dynamic over-provisioning servers 120 and one or more hardware device databases 106, discussed below.

The hardware devices 102 may comprise edge devices, host devices and other devices that execute user commands. The user devices 103 may comprise, for example, host devices and/or devices such as mobile telephones, laptop computers, tablet computers, desktop computers or other types of computing devices. Such devices are examples of what are more generally referred to herein as "processing devices" which may benefit from the disclosed dynamic over-provisioning techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary hardware device 102 may comprise an over-provisioning management module 112, a storage reallocation module 114 and one or more storage devices 116 (e.g., one or more SSDs and/or one or more hard disk drives (HDDs)). In some embodiments, the over-provisioning management module 112 automatically detects a size of the over-provisioning partition reaching a threshold value, as discussed further below in conjunction with FIGS. 3 through 5. The storage reallocation module 114 may reallocate portions of a user partition to the over-provisioning partition in response to the size of the over-provisioning partition reaching the threshold value.

It is to be appreciated that this particular arrangement of elements 112, 114, 116 illustrated in the hardware device 102 of the FIG. 1 embodiment is presented by way of example only, and alternative arrangements can be used in other embodiments. For example, the functionality associated with elements 112, 114, 116 in other embodiments can be combined into a single element, or separated across a larger number of elements. As another example, multiple distinct processors can be used to implement different ones of elements 112, 114 and 116, or portions thereof.

At least portions of elements 112, 114, 116 may be implemented at least in part in the form of software that is stored in memory and executed by a processor. An exemplary process utilizing elements 112, 114, 116 of the hardware device 102 in computer network 100 will be described in more detail with reference to FIGS. 4 and 5, for example.

Other hardware devices 102 (not shown in FIG. 1) are assumed to be configured in a manner similar to that shown for hardware device 102 in the figure.

The dynamic over-provisioning server 120 may be implemented, for example, on the cloud, such as a private cloud, or on the premises of an enterprise or another entity. In some embodiments, the dynamic over-provisioning server 120, or portions thereof, may be implemented as part of a host device. The dynamic over-provisioning server 120 may implement server-side functionality associated with the disclosed dynamic over-provisioning techniques, such as, for example, implementing policies for dynamic over-provisioning or for designating one or more thresholds for initiating the disclosed dynamic over-provisioning techniques. With the disclosed dynamic over-provisioning techniques, the detection of the size of the over-provisioning partition reaching a threshold value triggers a reallocation of portions of a user partition to the over-provisioning partition.

Additionally, the hardware device 102 and/or the dynamic over-provisioning server 120 can have an associated hardware device database 106 configured to store, for example, information related to various devices, such as one or more hardware devices 102, such as storage over-provisioning ratios, device locations, network address assignments and performance data. The hardware device database 106 may be maintained, for example, by the dynamic over-provisioning server 120 and accessible by one or more hardware devices 102.

The hardware device database 106 in the present embodiment is implemented using one or more storage systems associated with the dynamic over-provisioning server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more hardware devices 102, user devices 103 and/or dynamic over-provisioning servers 120 may be implemented on a common processing platform, or on separate processing platforms. The one or more hardware devices 102 and user devices 103 may be configured to interact over the network 104 in at least some embodiments with the dynamic over-provisioning server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more hardware devices 102, user devices 103 and/or dynamic over-provisioning servers 120 can be one or more input-output devices (not shown), which illustratively comprise keyboards, displays or other types of input-output devices in any combination. Such input-output devices can be used, for example, to support one or more user interfaces to the dynamic over-provisioning server 120, as well as to support communication between the dynamic over-provisioning server 120 and other related systems and devices not explicitly shown.

The one or more hardware devices 102, user devices 103 and/or dynamic over-provisioning servers 120 in the FIG. 1 embodiment are assumed to be implemented using at least one processing device. Each such processing device generally comprises at least one processor and an associated memory and implements one or more functional modules for controlling certain features of the respective device.

More particularly, the one or more hardware devices 102, user devices 103 and/or dynamic over-provisioning servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more hardware devices 102, user devices 103 and/or dynamic over-provisioning servers 120 to communicate in some embodiments over the network 104 with each other (as well as one or more other networked devices, not shown), and illustratively comprises one or more conventional transceivers.

It is to be understood that the particular set of elements shown in FIG. 1 for dynamic over-provisioning of storage devices is presented by way of illustrative example only, and in other embodiments additional or alternative elements may be used. Thus, another embodiment includes additional or alternative systems, devices and other network entities, as well as different arrangements of modules and other components.

Figure 2:
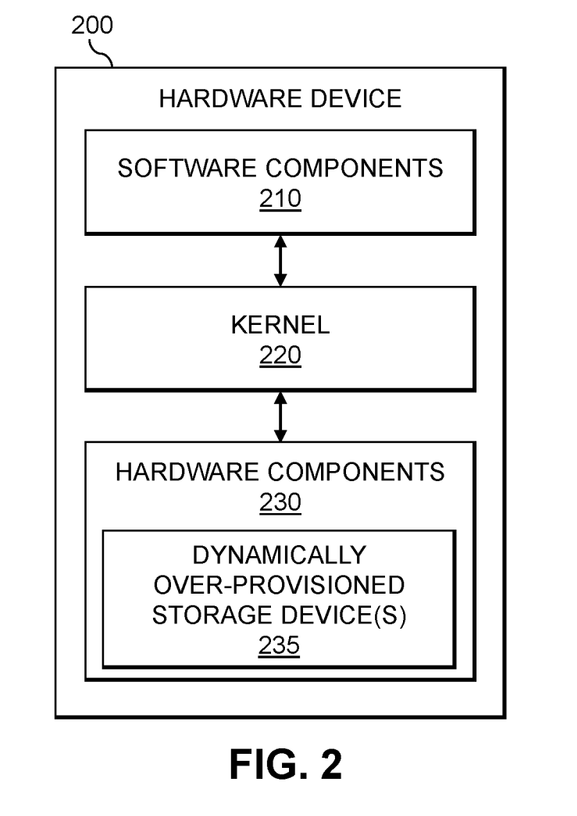
FIG. 2 illustrates the hardware device of FIG. 1 in further detail in accordance with an illustrative embodiment.

FIG. 2 illustrates a hardware device 200 in accordance with an illustrative embodiment. In the example of FIG. 2, the hardware device 200 comprises a kernel 220, resident in the memory of the hardware device 200, that provides an interface between software components 210 and hardware components 230. The hardware components 230 comprise one or more dynamically over-provisioned storage devices 235.

As used herein, the term "kernel" shall be broadly construed to encompass any computer program that is part of an operating system of a hardware device 200 that enables interactions between such software components 210, such as applications, and the hardware components 230 of the hardware device 200. The hardware components 230 may comprise, for example, processing components, memory components, storage components, such as the one or more dynamically over-provisioned storage devices 235, and other hardware components.

In one or more embodiments, the dynamic over-provisioning techniques described herein detect the size of the over-provisioning partition reaching a threshold value and automatically trigger a reallocation of portions of a user storage partition to the over-provisioning partition, as discussed further below in conjunction with FIG. 3.

Figure 3:
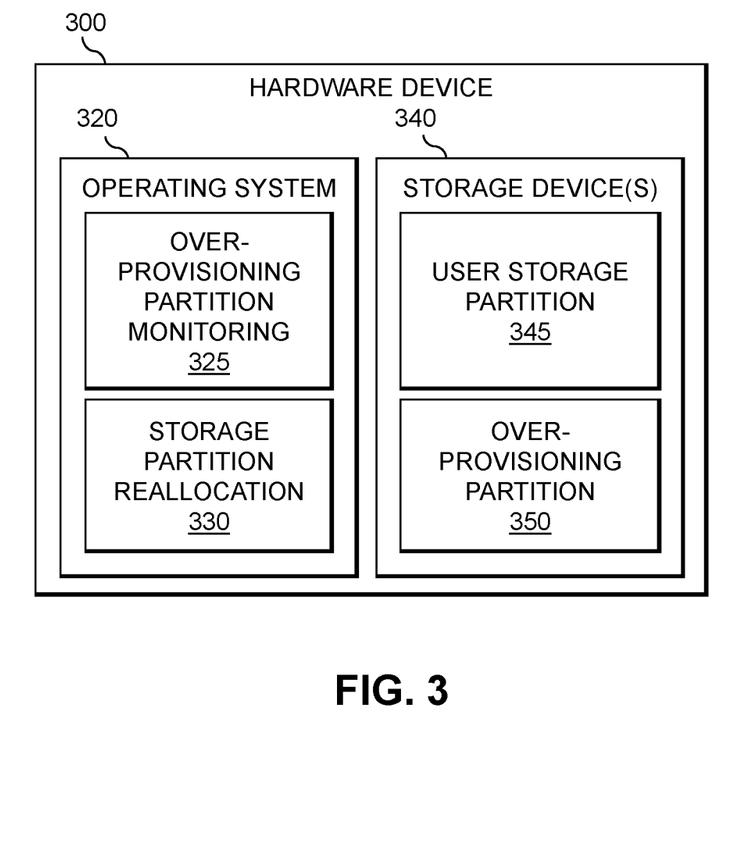
FIG. 3 illustrates a hardware device configured to provide dynamic over-provisioning in accordance with an illustrative embodiment.

FIG. 3 illustrates a hardware device 300 configured to provide dynamic over-provisioning in accordance with an illustrative embodiment. In the example of FIG. 3, the hardware device 300 comprises an operating system 320 and one or more storage devices 340, such as a dynamically over-provisioned storage device 235. The operating system 320 performs the dynamic over-provisioning techniques described herein and comprises an over-provisioning partition monitoring function 325 and a storage partition reallocation function 330.

The one or more storage devices 340 comprise a user storage partition 345 and an over-provisioning partition 350 representing an amount of reserve storage space in the respective storage devices 340. In one or more embodiments, the user storage partition 345 stores user data associated with one or more write operations.

In some embodiments, the over-provisioning partition monitoring function 325 automatically detects a size of the over-provisioning partition 350 reaching a threshold value. In response to the over-provisioning partition monitoring function 325 detecting the size of the over-provisioning partition 350 reaching the threshold value, the over-provisioning partition monitoring function 325 automatically triggers the storage partition reallocation function 330 to reallocate portions of the user storage partition 345 to the over-provisioning partition 350.

Figure 4:
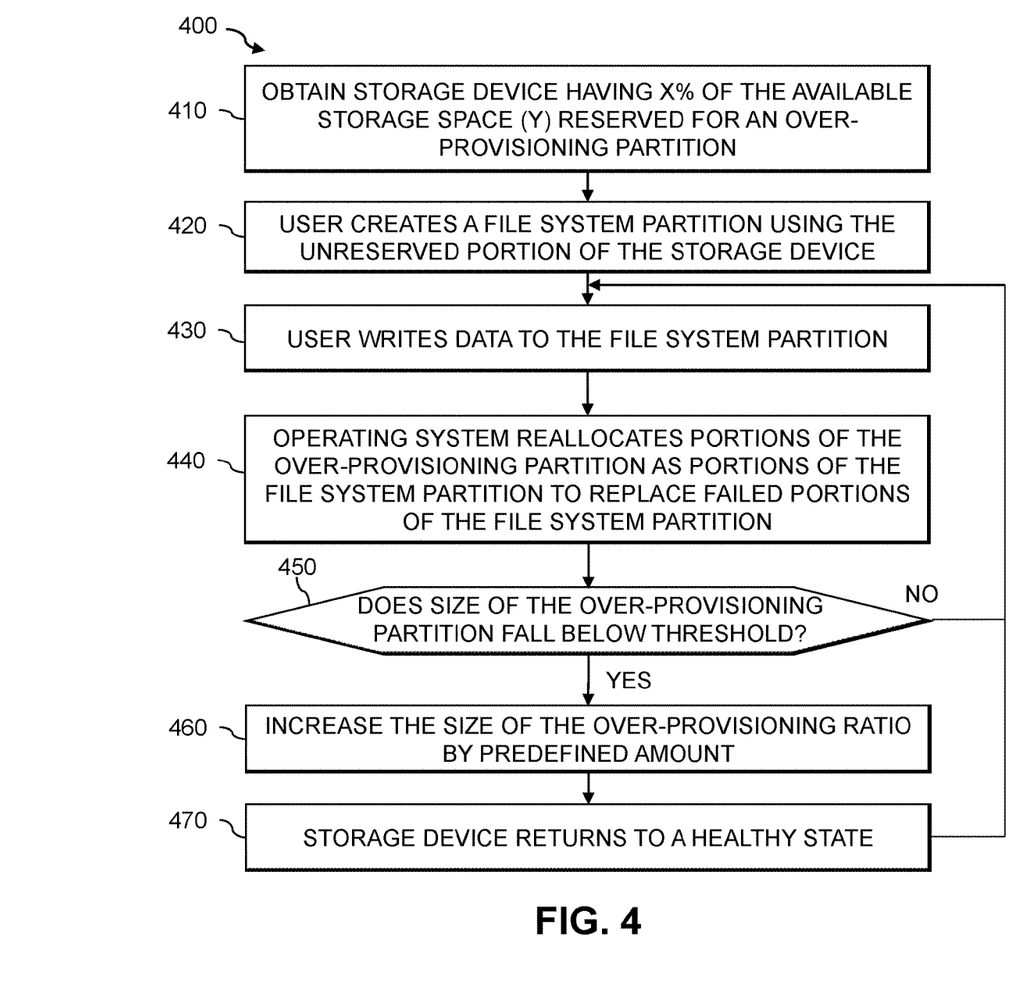
FIG. 4 is a flow chart illustrating an exemplary implementation of a process for dynamic over-provisioning of storage devices in accordance with an illustrative embodiment.

FIG. 4 is a flow chart illustrating an exemplary implementation of a process 400 for dynamic over-provisioning of storage devices in accordance with an illustrative embodiment. In some embodiments, the steps of the process 400 of FIG. 4 are performed by the over-provisioning partition monitoring function 325 and/or the storage partition reallocation function 330 associated with the operating system 320 of FIG. 3, unless otherwise noted.

In the example of FIG. 4, the process 400 obtains a storage device in step 410 having X % of the available storage space (Y) reserved for an over-provisioning partition (e.g., an over-provisioning ratio of X % of the available storage space, Y, determines the size of the over-provisioning partition 350).

In step 420, a user creates a file system partition (e.g., a user storage partition 345) using the unreserved portion of the storage device. In at least some embodiments, the size of the file system partition will be the available storage space, Y, less the size of the over-provisioning partition. In step 430, a user writes data to the file system partition.

In step 440, the operating system reallocates portions of the over-provisioning partition as portions of the file system partition to replace failed portions of the file system partition.

A test is performed in step 450 to determine if the size of the over-provisioning partition falls below a designated threshold. If it is determined in step 450 that the size of the over-provisioning partition has not fallen below the designated threshold, then program control returns to step 430 to continue in the manner described above.

If, however, it is determined in step 450 that the size of the over-provisioning partition has fallen below the designated threshold, then the process 400 increases the size of the over-provisioning ratio in step 460, for example, by a predefined amount (or percentage), as an exemplary mechanism for increasing the size of the over-provisioning partition. The storage device then returns to a healthy state in step 470 and program control returns to step 430 to continue in the manner described above.

Figure 5:
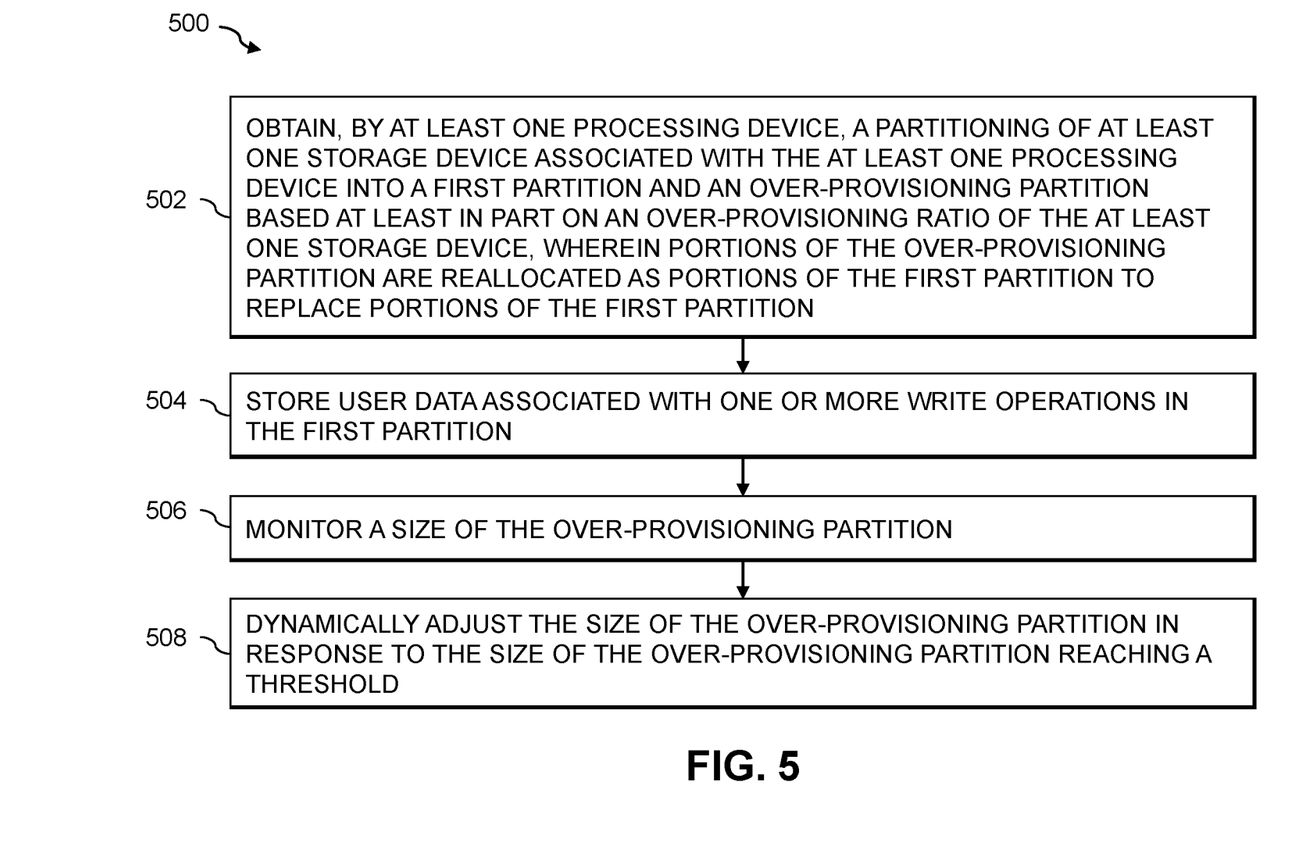
FIG. 5 is a flow chart illustrating an exemplary implementation of a process for dynamic over-provisioning of storage devices in accordance with an illustrative embodiment.

FIG. 5 is a flow chart illustrating an exemplary implementation of a process 500 for dynamic over-provisioning of storage devices in accordance with an illustrative embodiment. In the example of FIG. 5, the process 500 obtains, in step 502, by at least one processing device, a partitioning of at least one storage device associated with the at least one processing device into a first partition and an over-provisioning partition based at least in part on an over-provisioning ratio of the at least one storage device, wherein portions of the over-provisioning partition are reallocated as portions of the first partition to replace portions of the first partition.

In step 504, the process 500 stores user data associated with one or more write operations in the first partition. The size of the over-provisioning partition is monitored in step 506. The size of the over-provisioning partition is dynamically adjusted in step 508 in response to the size of the over-provisioning partition reaching a threshold.

In some embodiments, the over-provisioning partition of the at least one storage device is not available for storing user data. At least some of the portions of the over-provisioning partition may be reallocated as portions of the first partition to replace failed portions of the first partition. The dynamically adjusting the size of the over-provisioning partition may comprise reducing a size of the first partition. The reducing the size of the first partition may comprise reallocating unused portions of the first partition to the over-provisioning partition. The reducing the size of the first partition may comprise the operating system reducing a size of the first partition and reallocating the reduced size of the first partition to the over-provisioning partition. The over-provisioning ratio may correspond to the percentage of the at least one storage device allocated to the over-provisioning partition. The at least one storage device may comprise a solid-state drive.

The particular processing operations and other network functionality described in conjunction with FIGS. 4 and 5, for example, are presented by way of illustrative example only, and should not be construed as limiting the scope of the disclosure in any way. Alternative embodiments can use other types of processing operations for dynamic over-provisioning of storage devices. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for dynamic over-provisioning of storage devices can be employed, for example, to monitor the size of the over-provisioning partition and to dynamically reallocate portions of a user partition to the over-provisioning partition in response to the size of the over-provisioning partition reaching a threshold value.

One or more embodiments of the disclosure provide improved methods, apparatus and computer program products for dynamic over-provisioning of storage devices. The foregoing applications and associated embodiments should be considered as illustrative only, and numerous other embodiments can be configured using the techniques disclosed herein, in a wide variety of different applications.

It should also be understood that the disclosed dynamic over-provisioning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for dynamic over-provisioning of storage devices may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic over-provisioning engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based dynamic over-provisioning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
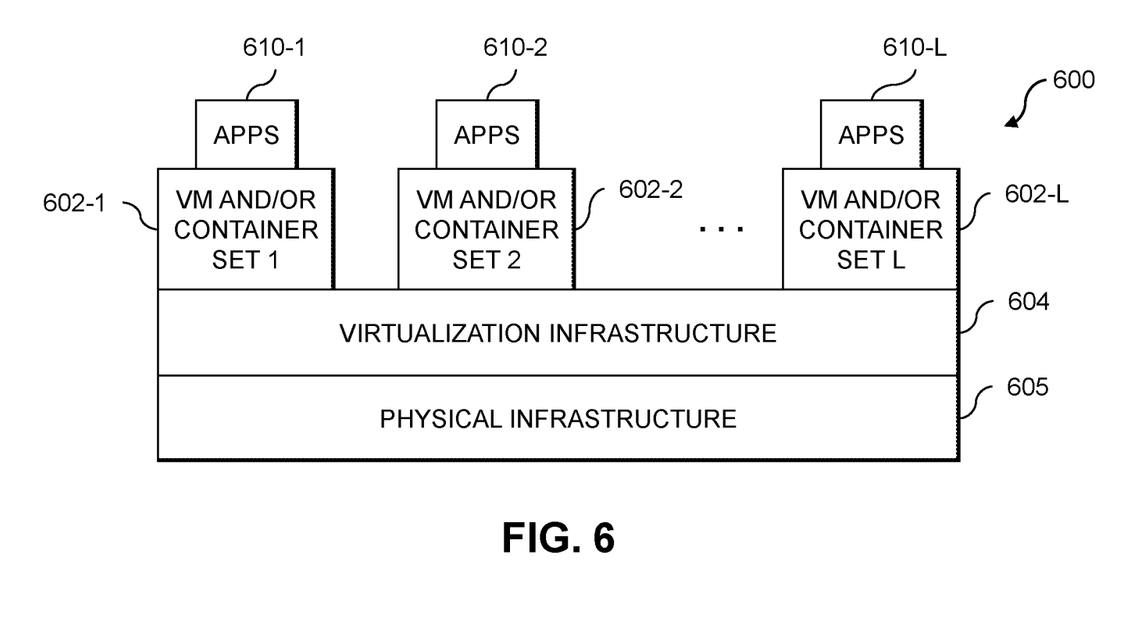
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide dynamic over-provisioning functionality of the type described above for one or more processes running on a given one of the VMs. For example, each of the VMs can implement dynamic over-provisioning control logic and associated storage partition reallocation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide dynamic over-provisioning functionality of the type described above for one or more processes running on different ones of the containers. For example, a container host device supporting multiple containers of one or more container sets can implement one or more instances of dynamic over-provisioning control logic and associated storage partition reallocation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
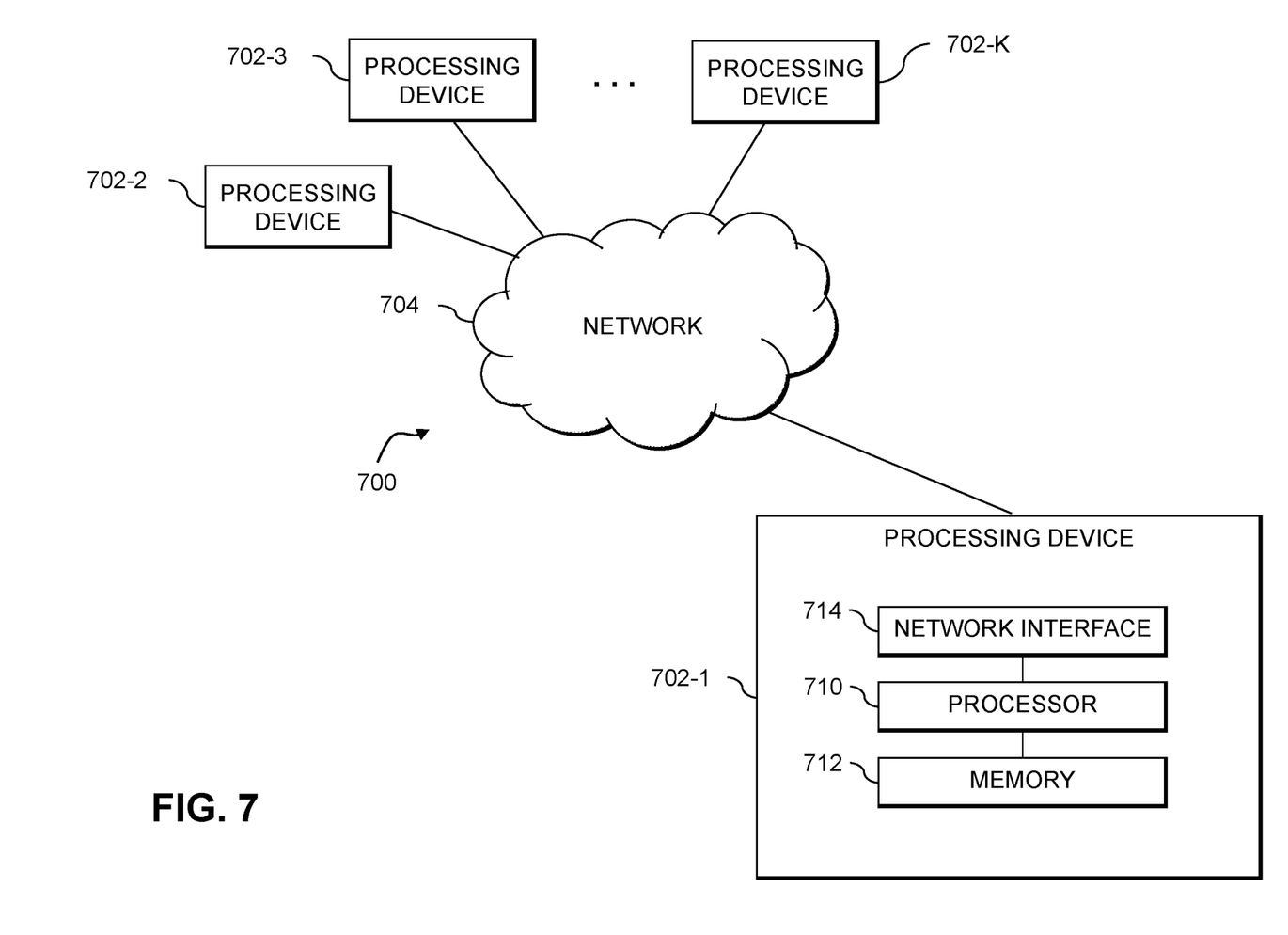
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by at least one processing device, a partitioning of at least one storage device associated with the at least one processing device into a first partition and an over-provisioning partition based at least in part on an over-provisioning ratio of the at least one storage device, wherein portions of the over-provisioning partition are reallocated as portions of the first partition to replace portions of the first partition;
storing user data associated with one or more write operations in the first partition;
monitoring a size of the over-provisioning partition; and
dynamically adjusting the size of the over-provisioning partition in response to the size of the over-provisioning partition reaching a threshold;
wherein the method is performed by the at least one processing device, wherein the at least one processing device comprises a processor coupled to a memory.

2. The method of claim 1, wherein the over-provisioning partition of the at least one storage device is not available for storing user data.

3. The method of claim 1, wherein at least some of the portions of the over-provisioning partition are reallocated as portions of the first partition to replace failed portions of the first partition.

4. The method of claim 1, wherein the dynamically adjusting the size of the over-provisioning partition of the at least one storage device further comprises reducing a size of the first partition.

5. The method of claim 4, wherein the reducing the size of the first partition comprises reallocating unused portions of the first partition to the over-provisioning partition.

6. The method of claim 4, wherein the reducing the size of the first partition comprises an operating system reducing the size of the first partition and reallocating the reduced size of the first partition to the over-provisioning partition.

7. The method of claim 1, wherein the over-provisioning ratio corresponds to the percentage of the at least one storage device allocated to the over-provisioning partition.

8. The method of claim 1, wherein the dynamically adjusting the size of the over-provisioning partition comprises dynamically increasing the size of the over-provisioning partition.

9. An apparatus comprising:
at least one processing device comprising a processor coupled to a memory;
the at least one processing device being configured to implement the following steps:
obtaining, by the at least one processing device, a partitioning of at least one storage device associated with the at least one processing device into a first partition and an over-provisioning partition based at least in part on an over-provisioning ratio of the at least one storage device, wherein portions of the over-provisioning partition are reallocated as portions of the first partition to replace portions of the first partition;
storing user data associated with one or more write operations in the first partition;
monitoring a size of the over-provisioning partition; and
dynamically adjusting the size of the over-provisioning partition in response to the size of the over-provisioning partition reaching a threshold.

10. The apparatus of claim 9, wherein the over-provisioning partition of the at least one storage device is not available for storing user data.

11. The apparatus of claim 9, wherein at least some of the portions of the over-provisioning partition are reallocated as portions of the first partition to replace failed portions of the first partition.

12. The apparatus of claim 9, wherein the dynamically adjusting the size of the over-provisioning partition of the at least one storage device further comprises reducing a size of the first partition.

13. The apparatus of claim 12, wherein the reducing the size of the first partition comprises reallocating unused portions of the first partition to the over-provisioning partition.

14. The apparatus of claim 12, wherein the reducing the size of the first partition comprises an operating system reducing the size of the first partition and reallocating the reduced size of the first partition to the over-provisioning partition.

15. A non-transitory processor-readable storage medium having stored therein program code of one or more software programs, wherein the program code when executed by at least one processing device causes the at least one processing device to perform the following steps:

obtaining, by the at least one processing device, a partitioning of at least one storage device associated with the at least one processing device into a first partition and an over-provisioning partition based at least in part on an over-provisioning ratio of the at least one storage device, wherein portions of the over-provisioning partition are reallocated as portions of the first partition to replace portions of the first partition;

storing user data associated with one or more write operations in the first partition;

monitoring a size of the over-provisioning partition; and dynamically adjusting the size of the over-provisioning partition in response to the size of the over-provisioning partition reaching a threshold.

16. The non-transitory processor-readable storage medium of claim 15, wherein the over-provisioning partition of the at least one storage device is not available for storing user data.

17. The non-transitory processor-readable storage medium of claim 15, wherein at least some of the portions of the over-provisioning partition are reallocated as portions of the first partition to replace failed portions of the first partition.

18. The non-transitory processor-readable storage medium of claim 15, wherein the dynamically adjusting the size of the over-provisioning partition of the at least one storage device further comprises reducing a size of the first partition.

19. The non-transitory processor-readable storage medium of claim 18, wherein the reducing the size of the first partition comprises reallocating unused portions of the first partition to the over-provisioning partition.

20. The non-transitory processor-readable storage medium of claim 18, wherein the reducing the size of the first partition comprises an operating system reducing the size of the first partition and reallocating the reduced size of the first partition to the over-provisioning partition.

* * * * *